United States Patent

[11] 3,562,550

| [72] | Inventor | Harry Fein<br>832 Quarter Mile Road, Orange, Conn. 06477 |
|---|---|---|
| [21] | Appl. No | 670,338 |
| [22] | Filed | Sept. 25, 1967 |
| [45] | Patented | Feb. 9, 1971 |

[54] METHOD OF AND APPARATUS FOR GENERATING HYPERBOLIC FUNCTIONS
11 Claims, 9 Drawing Figs.

[52] U.S. Cl. .................................................. 307/229,
235/197; 328/142
[51] Int. Cl. ....................................................... G06g 7/12,
G06f 15/34
[50] Field of Search .......................................... 307/229,
230; 328/142—145; 235/197

[56] References Cited
UNITED STATES PATENTS

| 3,210,558 | 10/1965 | Owen............................ | 307/228 |
| 3,354,298 | 11/1967 | Danko........................... | 235/197 |
| 3,369,128 | 2/1968 | Pearlman....................... | 307/229 |
| 3,423,578 | 1/1969 | Platzer, Jr. et al. ............ | 307/229X |

*Primary Examiner*—Stanley D. Miller, Jr.
*Attorney*—Fishman & Van Kirk

ABSTRACT: Apparatus for and methods of electrically simulating a hyperbolic function are disclosed. The function generator comprises suitably interconnected capacitor, constant voltage source and nonlinear circuit element; charging or discharge current of the capacitor being supplied through the nonlinear element which may be a transistor connected as a diode. Discharge of the capacitor is controlled by a suitably connected solid state switch.

DETECTOR WAVEFORM SEQUENCES

METHOD OF AND APPARATUS FOR GENERATING HYPERBOLIC FUNCTIONS

The inventiveness of these present specifications relate to processes and apparatus for generating hyperbolic functions and instantaneously detecting rate.

For the sake of clarity and ease of understanding I have separated the invention hereinafter to be fully disclosed into four divisions; said divisions comprising two electrical processes and two structures. The processes and apparatus are closely interrelated and each will help in the understanding of the full breath of the invention. Each of the parts can be described as follows: (1) a hyperbolic function generator: a device having a constant voltage source, a switch, a capacitor, and a component having an exponential current-voltage characteristic connected so that current will pass through the capacitor and the exponential component, and be a hyperbolic function of time. (2) a process for producing an inherently hyperbolic function: the passing of current through a capacitor and an exponential component thereby producing a current which is a hyperbolic function of time. (3) a process for instantaneously detecting rate: the (a) sampling and (b) resetting of the hyperbolic function generator in synchrony with a series of incoming events and as the output of the sampling sequence obtaining a direct measure of the instantaneous rate of the incoming events. (4) an instantaneous rate detector: a device for instantaneously detecting the rate of any series of events having a trigger circuit, reset generator, a hyperbolic function generator, and a sampling circuit working together so that incoming events create trigger pulses which in turn activate a reset generator, the reset generator in turn controls the hyperbolic function generator and finally the sampling circuit takes a brief measurement of the hyperbolic function generator output in synchrony with every incoming event and produces at its output a potential directly proportional in its electronic readout (with mathematical proof) to the instantaneous rate of the incoming sequence of events from interval to interval.

This is an invention whose point of novelty is twofold in magnitude and whose first point of novelty lies in a new and original method and apparatus for generating a hyperbolic function which is inherently hyperbolic in a natural, unapproximated manner due to the exploiting of known natural relationships and mathematical laws. The second point of novelty lies in a new and original manner for making use of hyperbolic functions to instantaneously detect rate by the proper sequence of viewing and resetting the aforementioned hyperbolic generator.

In the past hyperbolic functions have been generated by devices which would in effect synthesize the function by approximation using many linear segments.

My present invention has as one of its principle objects the goal of being able to generate electrically a hyperbolic function, without the use of approximations, in a simplified manner and in such a way that it will be inherently hyperbolic.

Another object of my invention is to synthesize a new method and device for instantaneous rate detection by integrating a hyperbolic function generator into a system whose sequence controls the timing and use of the hyperbolic function generator.

The subject matter which I regard as my invention is particularly pointed out and distinctly claimed in the concluding portion of this specification. The invention, however, both as to organization and method of operation, together with its objects and advantages thereof, may best be understood by reference to the following description taken in connection with the accompanying drawings wherein like reference characters refer to like elements and in which:

FIG. 1 portrays the ideal hyperbolic function; the abscissa is the time interval between events and the ordinate would be the computed rate $1/t$ (a hyperbola). Time $t$ can be units of microseconds, milliseconds etc., and is shown in units of alpha $\alpha$ throughout this specification.

Many of the features and further objects of the present invention will become apparent upon reading the following description in conjunction with the attached drawings.

The electronic uses and applications involving the generation of mathematically accurate hyperbolic functions are unlimited. It is a basic computational component. It lends itself directly to use in analogue computers, mathematical model building, and simulation of physical relationships through the construction of mock systems. It can be used in cardiotachometers and digital computers. It can be safely said that the scope of the uses to which the electrical generation of mathematically accurate hyperbolic functions can be put is beyond the ultimate intention of this specification. Although this is a new and original component it can be employed to advantage in instantaneous rate detection and is described in this context more fully in the latter portions of this specification.

Figure 1:
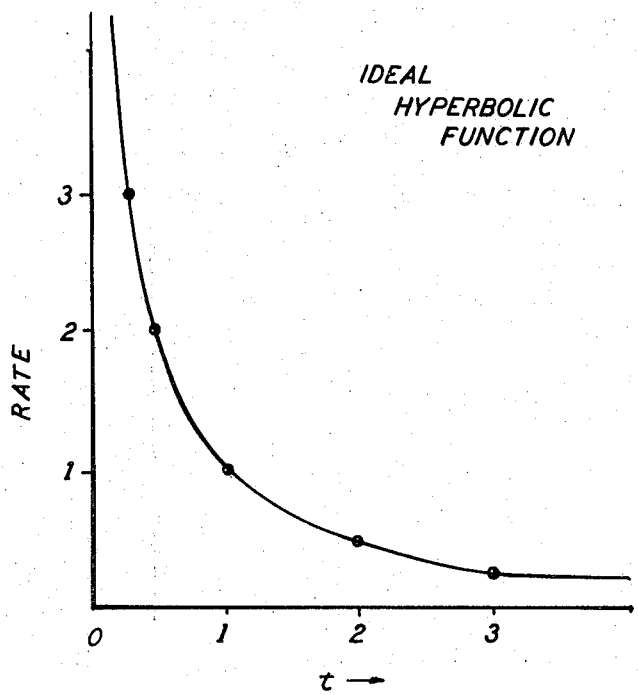

Previous methods of generating hyperbolic functions of time have involved construction of linear segment approximations to the hyperbolic function:

Rate $= 1/t$   Equation 1 or in words Rate equals the numeral one divided by time and where $t$ is the time between any two events in a continuing time series of events. This function is shown in FIG. 1. The method described herein involves exploiting a natural mathematical law and as a consequence results in an exact process and not an approximation.

Figure 2:
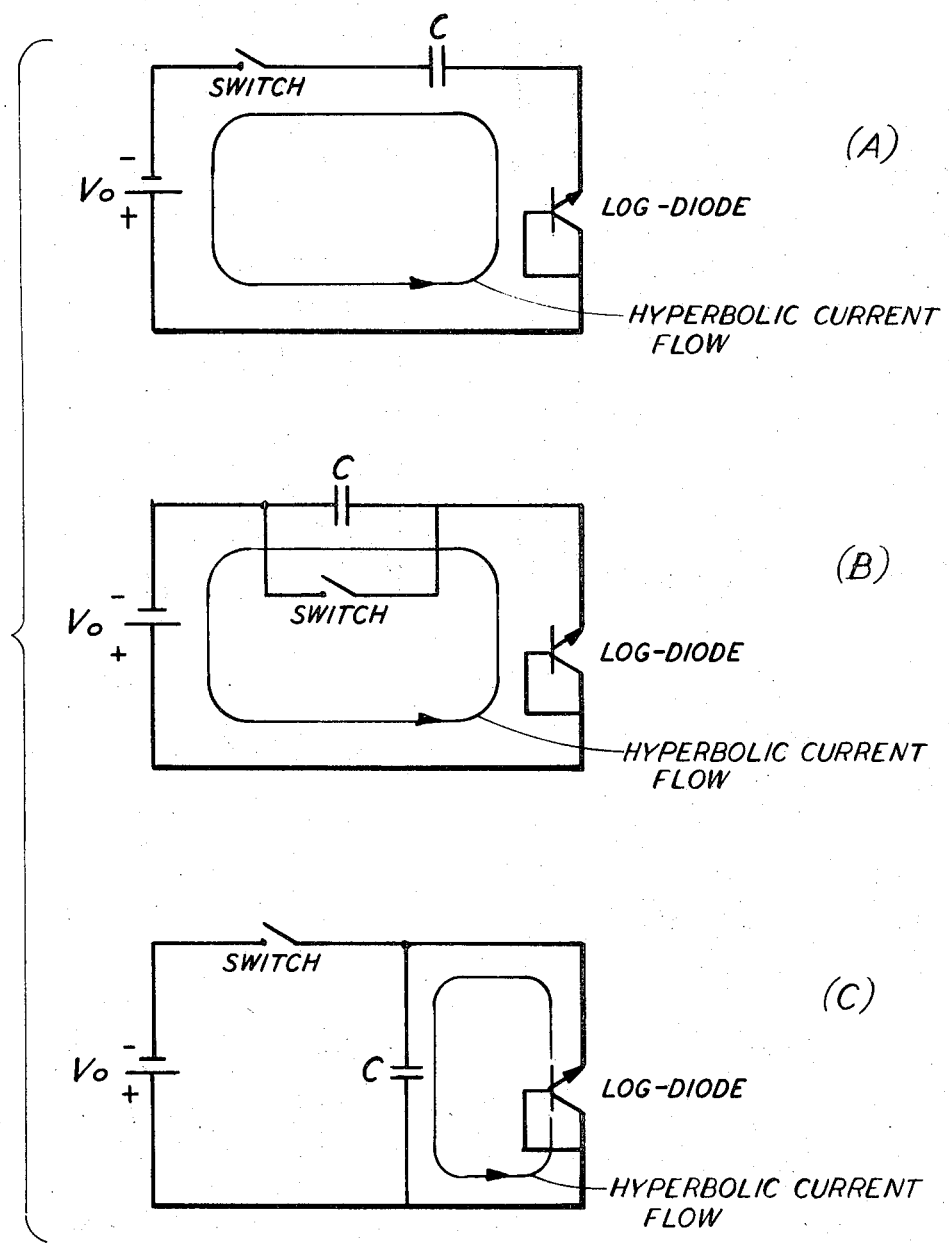
FIG. 2 represents elementary configurations that will generate the required hyperbolic function.

By using the fact that certain known devices, in particular planar transistors and transistor diodes etc., have certain known properties which are exponential in nature, we can proceed to construct an embodiment or outline a process to obtain a desired result, i.e., the generation of inherently hyperbolic functions. A relationship or property virtually ideally possessed by modern mesa and planar transistors operated as diodes with their collector to base potentials maintained at zero volts is a current-voltage relationship of the form:

$i = K \exp a V$   Equation 2 or current $i$ is an exponential function of voltage $V$. The symbols $K$ and $a$ are constants. The relationship stated in equation 2 can be expressed so that voltage is the dependent variable:

$$V = \frac{1}{a}\left[\log_e i - \log_e K\right] \quad \text{Equation 3}$$

thus, voltage is a logarithmic function of current. In FIG. 2a a series connection of a battery, a switch, a capacitor and a logarithmic device (transistor) are shown. If one solves the equation for the current $i$ in the simplified circuit, shown in FIG. 2a we get:

$$V_0 = \frac{q}{C} + \frac{1}{a}\left[\log_e i - \log_e K\right] \quad \text{Equation 4}$$

where $V_0$ is the battery potential $C$ is capacitance and $q$ is charge. We can obtain an expression for the current $i$ in Equation 4 as follows:

$$i = \frac{c/a}{t + c/aI_o}$$ Equation 5 where $I_o$ is the initial current at $t = 0$ $I_o = K \exp a V_o$ Equation 6 to simplify Equation 5, we let:

$c/a = b$ Equation 7 and $c/aI_0 = \alpha$ Equation 8 we get:

$$i = \frac{b}{t + \alpha}$$ Equation 9

Figure 3:
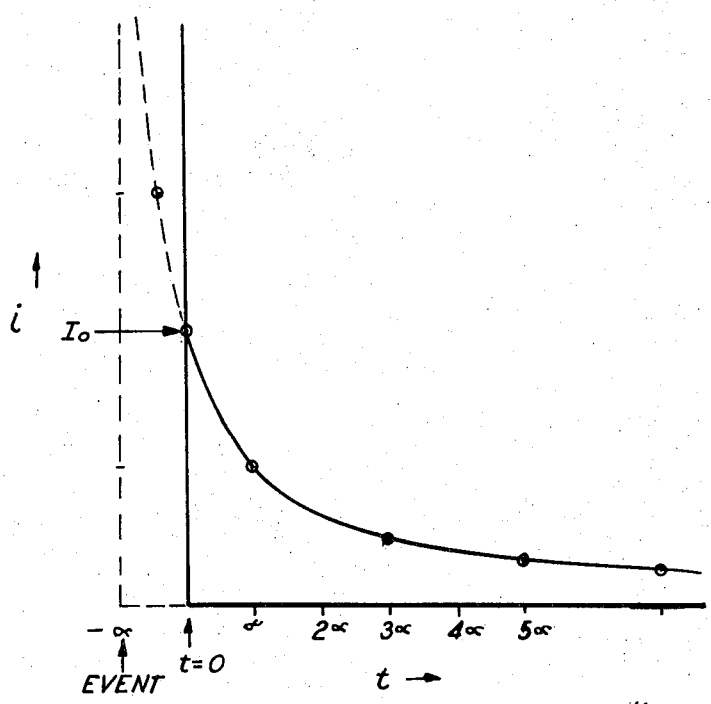
FIG. 3 represents that part of the hyperbolic function which would actually be generated by any of the simple circuits of FIG. 2.

Thus, Equation 9 explicitly shows the current $i$ generated is a hyperbolic function of time and follows a hyperbolic form which is asymptotic to the coordinate axis $t =$ minus alpha and $i = 0$ as shown in FIG. 3.

Figure 4:
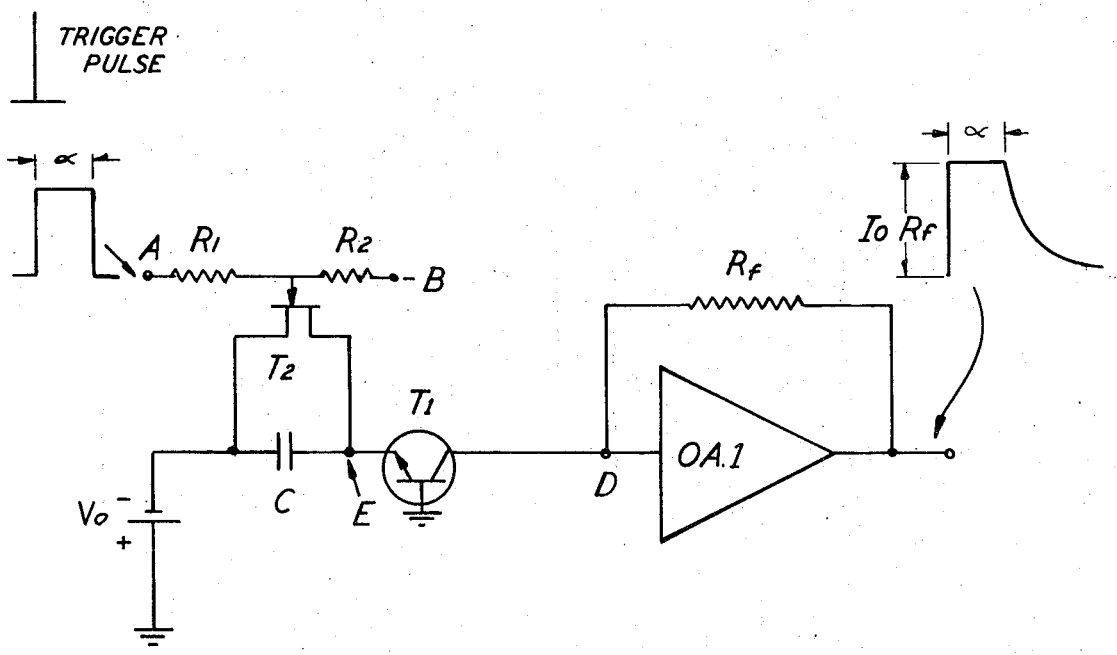
FIG. 4 is a schematic of a practical elaboration with working detail of the simplified hyperbolic function generator shown in FIG. 2b.

We can see in FIG. 3 that the actual part of the hyperbolic function generated begins at $t = 0$, $i=I_0$ or when time $t$ equals zero and current $i$ equals $I_0$ and falls asymptotically towards zero as time increases. Thus by closing a switch shown in FIG. 2 we generate only that part of the hyperbola which is presumed to occur alpha seconds after any starting time or event. A physical embodiment which will generate the desired hyperbolic function is shown in FIG. 4 wherein T1 is a planar transistor diode-connected, which serves as the exponential element. T2 is a field-effect transitor switch which short circuits the capacitor C when a positive rectangular reset pulse is applied at point A. At the end of this pulse or when the pulse is ended the switch transistor turns off and the capacitor is allowed to charge in series with the logarithmic or exponential element T1. An operational amplifier OA1 (FIG. 4) can be used both to measure the charging current and to maintain point D at near zero potential. Thus the output of this amplifier will dwell at its positive extreme where the initial current $I_o$ times the feedback resistor $R_f$ is the maximum output voltage of the hyperbolic function generator for the duration of the shorting pulse and will decay hyperbolically with time when the shorting pulse ends. By delaying the start of capacitor charging by alpha seconds a charging current is obtained which is inherently a hyperbolic function for all times greater than alpha seconds after the initial triggering event.

Figure 5:
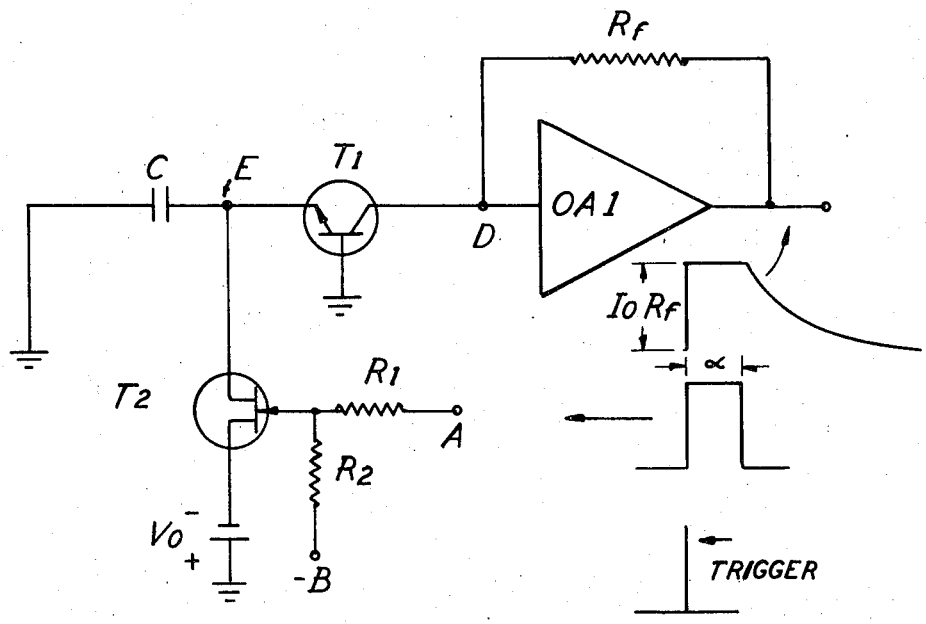
FIG. 5 is a schematic showing the practical elaboration (with working detail) of the simple hyperbolic function generator shown in FIG. 2c.

The best mode of construction and operation of the hyperbolic generator contemplated by me is shown in FIG. 5. The operation of this circuit is essentially the same as that of FIG. 4 discussed above. The difference is in the position of the capacitor C which now has one end grounded. This is the form that is preferred for the instantaneous rate detector shown in FIG. 9. Here the reset pulse turns the switch T2 to its on or low resistance state thus charging C to $-V_o$ volts. At the end of the reset pulse, the switch is opened and capacitor discharges through T1 the logarithmic device into point D, a virtual ground or a point maintained near zero potential. The discharge current as before is hyperbolic with time. It is implicit in the foregoing not only that I have shown an embodiment but also a new method for generating hyperbolic functions which are inherently mathematically accurate in nature.

The method which I have invented then is a method for generating a current as a hyperbolic function of time comprising the steps of passing current from a constant voltage source through a capacitor and then through an exponential device connected in series such that the current is inherently a hyperbolic function of time.

A process and device for instantaneous rate detection are herein described by which a hyperbolic function of time is generated to that we can obtain a voltage proportional to instantaneous rate. Since instantaneous rate is by definition the inverse of the time interval between events, it is therefore a hyperbolic function of the time intervals between successive events (as shown in FIG. 1).

This invention involves a detector which follows and measures every interval in a continuing series of pulses, cycles or more generally events. The detector computes the rate of each interval by taking the reciprocal of the interval's length. This should not be confused with average rate detection as this is a much more efficient and precise technique than where an average rate is measured. It is clear then that is system and device is distinct from well known so-called rate meters which compute and display average rate or frequency.

There are several uses to which an instantaneous rate detector can be put, I can suggest a few. It can be used in systems where information has been previously encoded or recorded in pulse rate (or frequency) modulated form by instruments such as voltage to frequency generators to detect or demodulate the original modulating signal. It has direct use as an instantaneous tachometer which would allow close following of variations in speed or rate. An example of this would be its use as a cardiotachometer, for measuring the rate of heart beats from one heart beat to the next heart beat. It can be used to monitor the flow of fluids in which a transducer has been inserted whose output is essentially pulsatile (a rotameter). This method can be used as a form of frequency modulation detector to track the cycle-to-cycle variations in frequency of a carrier. In a feedback control system where the output would be a pulsatile signal actuating such components as incremental stepping motors a rate detector would be needed to sample the signal for feedback control of the motor or stepper.

My instantaneous rate detector may also be used as a component part of a pulse rate modulation and demodulation system in which a rate modulated series of electrical impulses must be detected at the demodulation end of the system.

Figure 6:
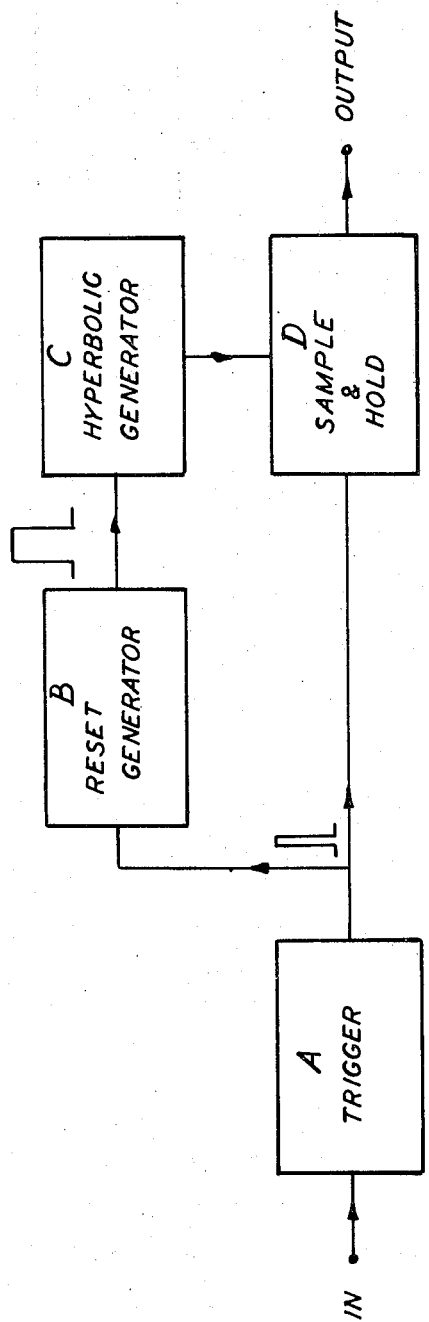
FIG. 6 is a system block diagram of the instantaneous rate detector including a trigger circuit A, a reset generator B, the hyperbolic generator C, and a sample and hold circuit for storage D.
Figure 7:
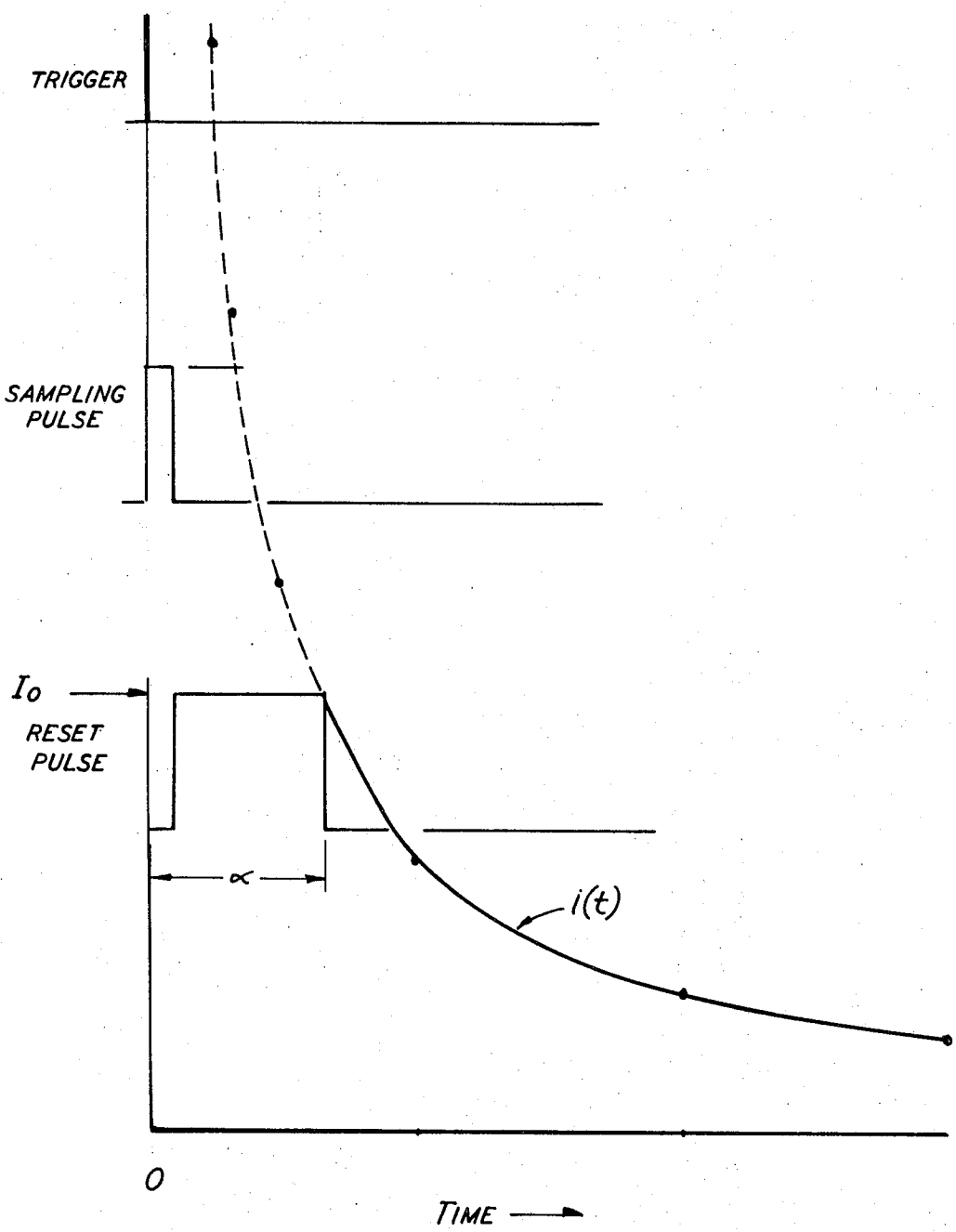
FIG. 7 shows the relationship between the trigger, sampling pulse, and reset pulse with regard to the start of the hyperbolic rundown and is an enlargement of FIG. 8 parts $b$, $c$, $d$ and $e$.
Figure 8:
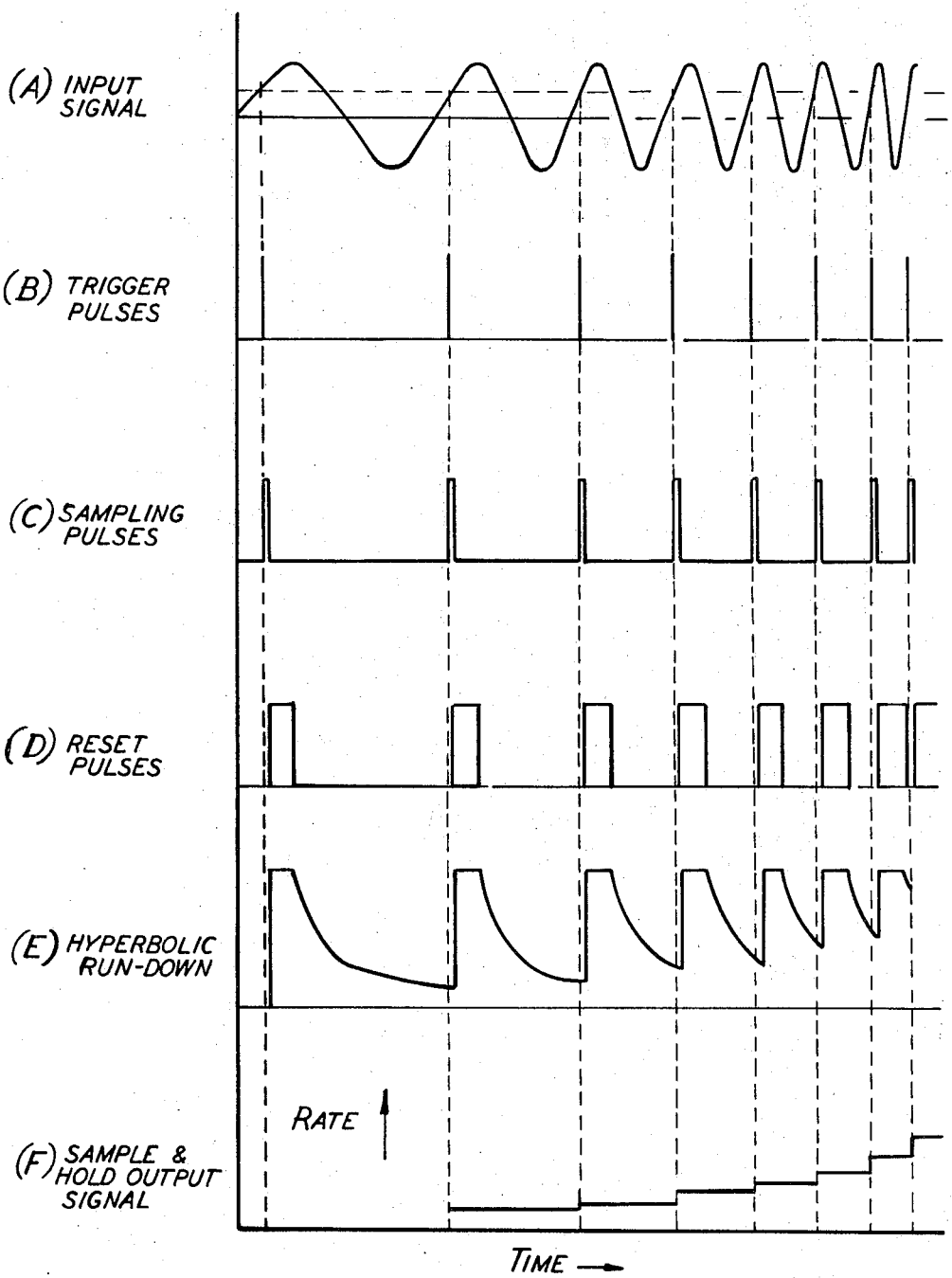
FIG. 8 shows a timing sequence portraying the actual time relationship of the salient waveforms in the rate detector.

FIGS. 6, 7 and 8 display a system block diagram of my detector and the system timing sequences. The input signal whose rate is to be measured is presented to an amplitude discriminator. This signal is shown to be sinusoidal in FIG. 8 but can be any time varying sequence. The amplitude discriminator generates a trigger pulse each time the signal reaches an arbitrary amplitude. Each trigger pulse first briefly samples the output of the hyperbolic generator and this value is held in the sample and hold circuit until a new sample is taken. At the end of the brief sample period, the reset generator resets the hyperbolic generator by either shorting the capacitor C of FIG. 4 or by recharging C to its initial value as pictured in the diagram presented in FIG. 5. After a total elapsed time of alpha seconds from the start of the trigger pulse, the hyperbolic generator's switch transistor T2 is turned off and the capacitor is allowed to either charge as in FIG. 4 or to discharge as in FIG. 5 through T1, the exponential or logarithmic component. The output voltage of the current measuring operational amplifier OA1 (FIGS. 4 and 5) falls hyperbolically with the internal current from an initial voltage of $I_oR_f$ volts towards zero until the next event arrives which will sample the hyperbolic current level and the above sequence is repeated. Thus the output of the sample and hold circuit are steplike voltage levels directly proportional to the rate of the input signal. At any time the level represents the rate of the interval just preceding the last event observed (as shown in FIG. 8f). These steps may be filtered if desired to generate a smoother output signal. A convenient measure of the speed with which the hyperbolic function decreases is alpha. Equation 9 shows that when $t$ equals alpha the current $i$ is one-half of its initial value. Since alpha is also the minimum time interval possible between successive events it should be clear that $$\text{Maximum rate} = \frac{1}{\alpha}$$ Equation 10

It will obviously be necessary to change alpha if we are to change the maximum rate (the range) of the system.

As mentioned earlier in Equation 8

$$\text{alpha} = \frac{c}{aI_0}$$

Thus if we wish to change alpha to effect a range change, it is necessary to change either C or $I_o$ since $a$ is a constant which is a function of the physics of the logarithmic or exponential device (a transistor). For convenience it was elected to vary alpha by changing the value of the capacitor C in FIG. 4 and FIG. 5. We control the decay constant by controlling capacitance. Thus each alpha value will have an associated capacitor which must be selected when the instruments's maximum rate, or range, is desired to be changed.

More directly stated than what I have shown is a method for instantaneously detecting rate comprising the steps of: (a) generating a hyperbolic function, (b) sampling the hyperbolic function when an incoming event occurs and storing this value, (c) resetting the hyperbolic function generator, these steps $a$, $b$ and $c$ being performed in a repeated sequence which is initiated by each of the series of incoming events and whereby the resulting output of the sampling device is a direct measure of the instantaneous rate of the incoming series of events.

As is now apparent from the preceding discussion of the instantaneous rate detector's operation we see that the basic elements that are required to build a working model are as follows: a trigger circuit, a reset generator, a hyperbolic function generator whose output is hyperbolic with time as a consequence of the internally generated hyperbolic current, and a sampling circuit all operating together as aforementioned.

Figure 9:
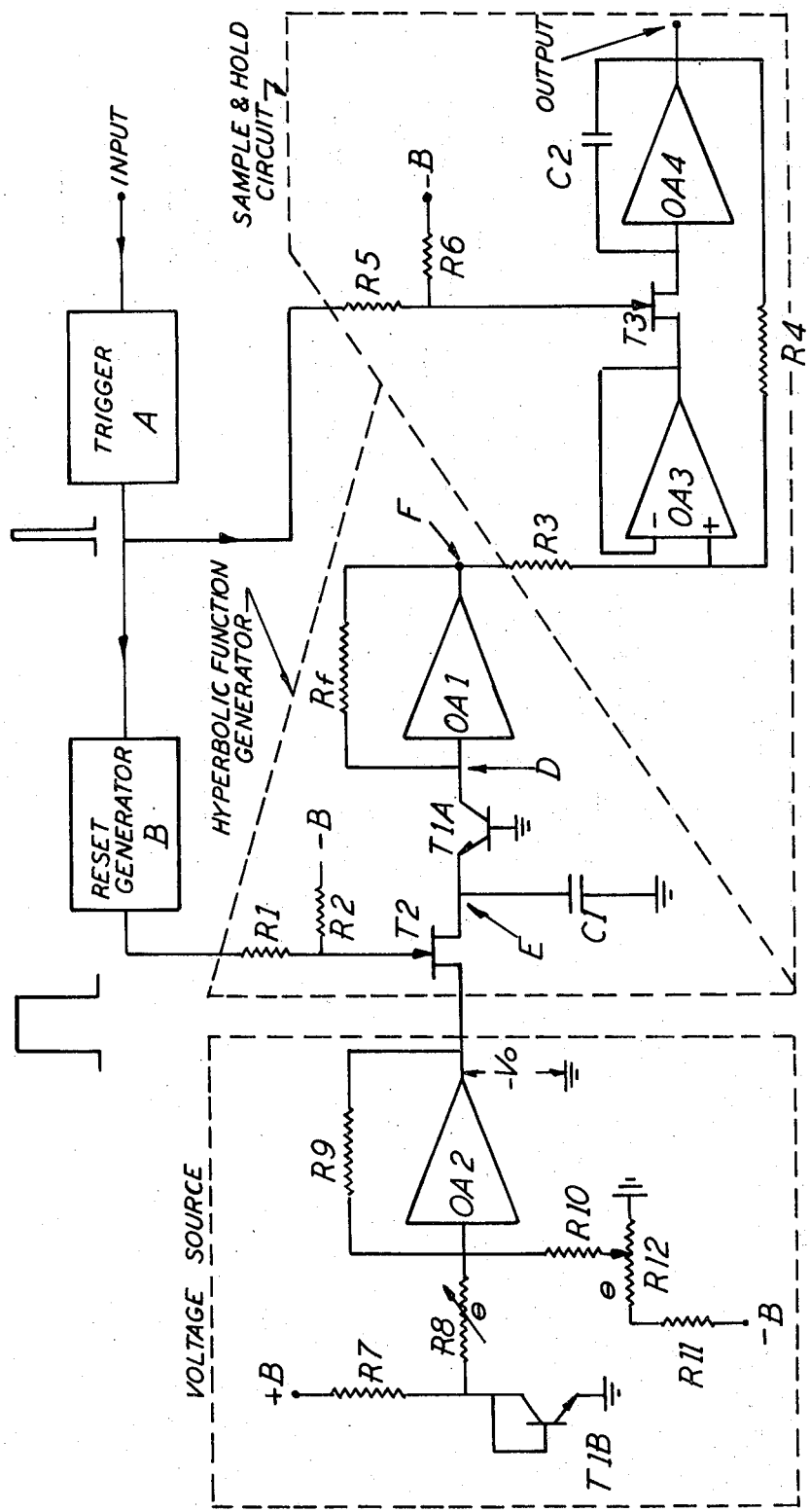
FIG. 9 is a drawing of the basic electronic elements showing a complete instantaneous rate detector, in the best mode presently contemplated by me.

In FIG. 9 a general schematic drawing of a working detector is shown. The trigger circuit A and reset generator B are not shown in detail since they are well-known circuits. Basically, a trigger circuit is a circuit which generates a short rectangular pulse of constant amplitude and width every time an input signal reaches an arbitrary threshold level. This can best be constructed by using a so-called Schmitt trigger circuit whose output drives a single-shot multivibrator. A reset generator is a rectangular pulse generator of variable duration. This can best be constructed by using a single-shot multivibrator wherein the duration of the rectangular pulse can be varied by changing timing resistors as dictated by the necessary value of alpha.

The hyperbolic generator is shown as a field-effect transistor switch T2, the logarithmic transistor T1A, and operational amplifier OA1 a capacitor C1 and a feedback resistor $R_f$, the workings of which have already been related in detail. The voltage source or "electronic battery" is composed of resistors R7 through R12, T1B and OA2. This voltage source constitutes a low resistance source of variable potential $-V_0$ which also provides temperature compensation for the logarithmic element T1A, since T1A and T1B are halves of a dual planar transistor pair in a common housing.

The sampling circuit or sample and hold generator is composed of OA3, OA4, R3, R4, T3 and C2. The brief sampling pulse turns the field-effect transistor switch T3 on (switch closed) momentarily. This allows C2 to immediately assume the value of the voltage output of the hyperbolic generator. After this instant the switch T3 opens and while open C2 holds this value of the amplitude of the hyperbolic function generator. This value is held by C2 until a new sampling pulse is generated, whereupon C2 will either be charged to a new higher value, stays the same or discharges to a lower value depending on the amplitude of the hyperbolic function it sees.

The reset generator B, generates a pulse whose duration is sufficient to recharge the capacitor C1 to its initial value such that alpha seconds has elapsed from the start of the trigger pulse. The reset pulse then ends allowing the discharge of the capacitor through T1A as discussed earlier.

This completes my description of the operation and structure of A SYSTEM FOR HYPERBOLIC FUNCTION GENERATION AND INSTANTANEOUS RATE DETECTION by the best modes contemplated by me in as full, clear and exact a manner and when read in conjunction with my drawings, it is such as will enable others skilled in the art to make and use the same.

As should now be apparent my invention is capable of a wide range of uses and commercial applications and I am not to be limited to any of those described or suggested, which employ my invention in any manner equivalent to or within the spirit of this disclosure as indicated by the appended claims.

I claim:
1. A hyperbolic function generator comprising:
a constant voltage source;
capacitive circuit means;
output circuit means including input and output terminals, an electrical current commensurate with the function to be generated being measured at said output terminal;
an element which produces an output current commensurate with an exponential function of an applied voltage, said element being connected between a first terminal of said capacitive circuit means and the input terminal of said output circuit means;
means connecting the other terminal of said capacitive circuit means to a first polarity terminal of said constant source;
normally open switch means connected to said capacitive circuit means and said constant voltage source for selectively controlling the charging of said capacitive circuit means; and
means for applying control signals to said normally open switch means.

2. The apparatus of claim 1 wherein said normally open switch means is connected between said first terminal of said capacitive circuit means and the second polarity terminal of said voltage source.

3. The apparatus of claim 2 wherein said element which produces an exponential current comprises, a semiconductor device.

4. The apparatus of claim 3 wherein said semiconductor device comprises, a transistor connected as a diode.

5. The apparatus of claim 1 wherein said voltage source, capacitive circuit means and exponential current producing element are connected in series.

6. The apparatus of claim 5 wherein said switch means is connected in parallel with said capacitive circuit means.

7. The apparatus of claim 6 wherein said element which produces an exponential current comprises, a semiconductor device.

8. The apparatus of claim 7 wherein said semiconductor device comprises, a transistor connected as a diode.

9. A method of electrically simulating a hyperbolic function comprising the steps of:
applying a voltage from a constant voltage source to a capacitor;
periodically discharging the capacitor; and
measuring the current through a device which exhibits an exponential current verses voltage response, the exponential device being connected in series with the capacitor.

10. The method of claim 9 wherein the charging current of the capacitor is supplied through the exponential device and is measured after each periodic discharge of the capacitor.

11. The method of claim 9 wherein the capacitor discharges through the exponential device and the discharge current is measured.